May 23, 1967  J. F. MORSE  3,320,665
METHOD OF MAKING PUSH-PULL CABLE CASINGS
Filed Oct. 2, 1962  3 Sheets-Sheet 1

INVENTOR.
JOHN F. MORSE
BY Hamilton & Cook
ATTORNEYS

May 23, 1967 J. F. MORSE 3,320,665
METHOD OF MAKING PUSH-PULL CABLE CASINGS
Filed Oct. 2, 1962 3 Sheets-Sheet 2
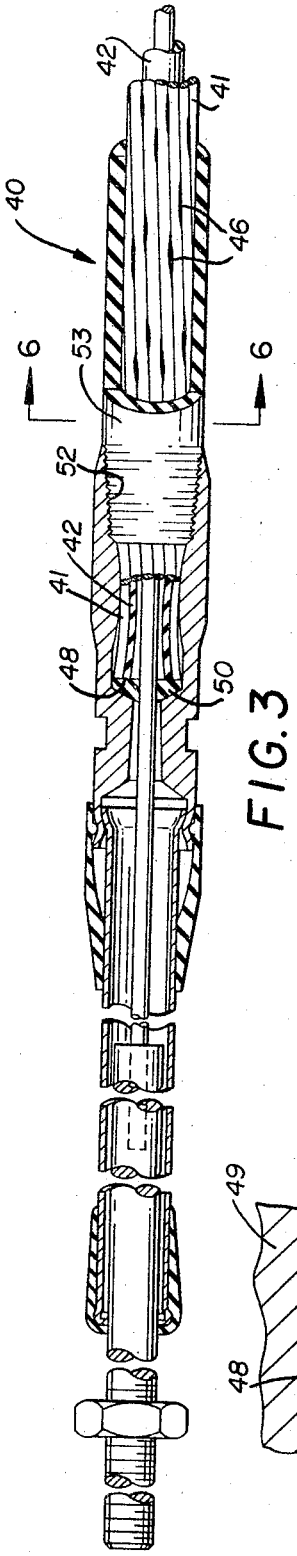
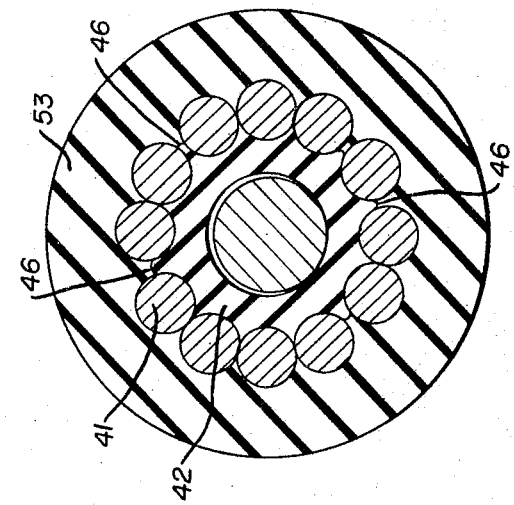
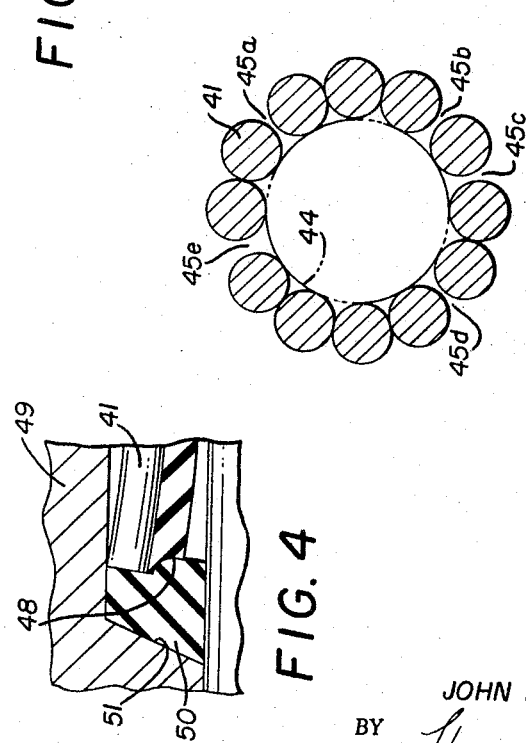
INVENTOR.
JOHN F. MORSE
BY Hamilton & Cook
ATTORNEYS May 23, 1967  J. F. MORSE  3,320,665
METHOD OF MAKING PUSH-PULL CABLE CASINGS
Filed Oct. 2, 1962  3 Sheets-Sheet 3
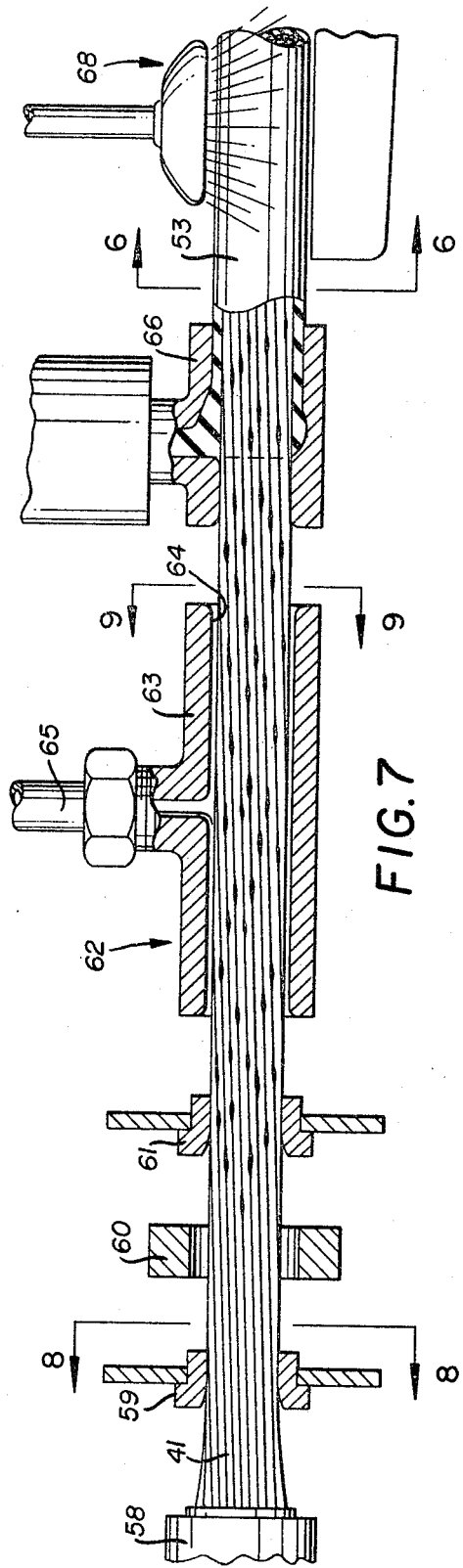
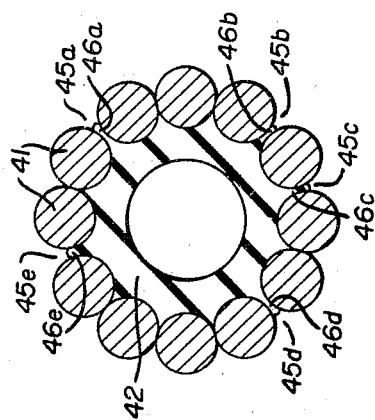
FIG. 9
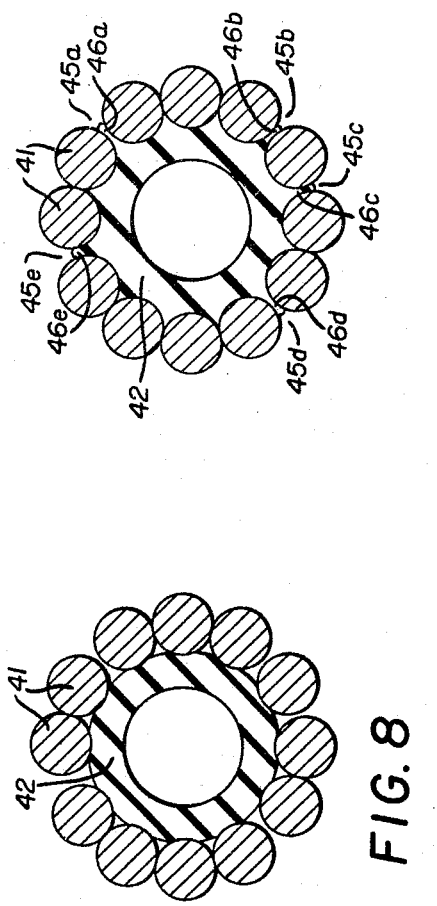
FIG. 8
INVENTOR.
JOHN F. MORSE
BY Hamilton Cook
ATTORNEYS

3,320,665
METHOD OF MAKING PUSH-PULL CABLE CASINGS

John F. Morse, 21 Clinton St., Hudson, Ohio 44216
Filed Oct. 2, 1962, Ser. No. 227,889
8 Claims. (Cl. 29—460)

The present invention relates generally to a method of manufacturing push-pull control cables. More particularly, the present invention relates to a method of manufacturing flexible control cable casings adapted to receive a flexible core slidable therein for transmitting mechanical motion in either direction when the casing is clamped in position.

The push-pull cable, generally, is well-known to the art and it is the purpose of the present invention to improve upon the method of manufacturing the outer casing.

Although the prior art shows many constructions for push-pull control cable casings, one of the most suitable constructions to assure greatest flexibility and efficiency comprises a plurality of wires laid contiguously in a long pitch helix around the outer periphery of a plastic tube. The helically arranged wires of the casing are maintained in their proper position solely by a plastic cover in the smaller cables and by a reinforcing spread helix of wire or flat metallic ribbon, in conjunction with the plastic cover, in larger cables.

The plastic tube which comprises the innermost element of the cable casing acts as a bearing for the core of the cable which is slidable within the casing and also acts to protect the casing wires from the elements having access to the interior of the tube. The plastic cover, which comprises the outermost element of the cable casing, not only acts as a structural member to retain the casing wires in the coil shape but also acts as a protective member to shelter the wires from the exterior elements.

Fittings are provided at each end of the cable to provide a means for securing the control cable in operative position and to seal, as well as possible, the ends of the wires from the elements. To be completely effective, an end fitting must cooperate with the interior tube and the outer cover. However, because the reciprocating action of the core within the casing tends to act as a pump and further because the prior art means of effecting a seal between the end fitting and the interior tube are generally unsatisfactory, the cable, when used in such exposed applications as with outboard motors, is subject to the entry of water from either or both ends of the cable which finds its way to the wires. Stainless steel and other non-corrosive metals are not satisfactory to provide the spring temper requirements of the wire which makes the best casings, so that the wires which are used are quite subject to rust, especially when subjected to salt-water exposure.

Nor would this corrosive action be limited to the ends of the wire in the cable casing. Because of the aforementioned pumping action, capillarity and/or gravity, once the water reaches the wires it will progress along the wires in the space between the contiguously wound wires and the radially outer surface of the inner tube or the radially inner surface of the outer cover.

With the inception of rust, the adjacent wires seize, or bond, together. This destroys the flexibility of the casing, so that the casing resists bending and will even retain portions of the arcs of previous bends, much like soft metal tubing. Just a few of these sets in the cable casing can easily reduce the efficiency of the cable by 50%.

To fully understand the importance of maintaining freedom from rust, and therefore maximum flexibility, it must be realized that a push-pull cable, at best, is a relatively inefficient mechanism. Some of the best push-pull cables available are capable of only about 50% efficiency when installed in a boat with an average number of bends between the control head and the engine.

Many outboard motors and some inboard engines or transmissions have high operating loads. Some makes of outboard motors may require as high as 40 pounds to move the shifting lever on the engine under some conditions of operation. This, in turn, even with an ideal installation having an average efficiency of 50%, would mean an input cable load at the remote control station of approximately 80 pounds. With a control head having a leverage ratio of 2½ to 1, this would result in a hand lever load of 32 pounds. When this hand lever load at the control head is compared to the hand lever load of an automatic transmission in a modern automobile, which might require a maximum of two pounds, it can readily be seen that some marine control systems, even under ideal conditions, may be operating at many times the load that might be considered desirable.

If, for some reason, the efficiency of the push-pull cable system should drop to 25%, the hand lever load at the control head would then be over 60 pounds, which is prohibitively high in terms of safe operation and customer acceptance.

It is therefore an object of the present invention to provide a method of making a push-pull cable casing in which the metallic wires are inaccessible to corrosive elements.

It is another object of the present invention to provide a method of making a push-pull cable casing in which the inner portion of the circumference of each of the casing wires is embedded in a plastic inner tube and the outer portion of the circumference of each wire is embedded in the plastic outer cover.

It is a further object of the present invention to provide a method of making a push-pull cable casing in which portions of the plastic inner tube extend between the casing wires in random location to anchor the inner tube against axial movement relative to the casing wires.

It is a still further object of the present invention to provide a method of making a push-pull cable casing as above which facilitates and assures that an effective seal to the end of the casing wire can be accomplished by the cooperation of the end fitting and the inner tube because of the interfitting of the casing wires with the tube.

These and other objects which will become apparent from the following specification are accomplished by means hereinafter described and claimed.

One preferred embodiment is shown by way of example in the accompanying drawings and described in detail without attempting to show all of the various forms and modifications in which the invention might be embodied; the invention being measured by the appended claims and not by the details of the specification.

In the drawings:

FIG. 3 is a view similar to FIG. 1 of a push-pull control cable employing a cable casing according to the concept of the present invention.

FIG. 4 is an enlarged area of FIG. 3.

FIG. 5 is a schematic representation in cross section of the coiled wires in the casing.

FIG. 6 is an enlarged transverse cross section taken substantially on line 6—6 of FIGS. 3 and 7.

FIG. 7 is a schematic representation of the process for making the improved cable casing.

FIG. 8 is an enlarged cross section taken substantially on line 8—8 of FIG. 7.

FIG. 9 is an enlarged cross section taken substantially on line 9—9 of FIG. 7.

In general, a push-pull cable casing constructed in accordance with the concept of the present invention comprises a plurality of casing wires laid side-by-side in a long pitched helically spiraled coil around a flexible resinous plastic inner tube, as shown in FIGS. 6 and 7. The radially inner surface, i.e., approximately one-half the surface, of each of the casing wires is embedded into the inner tube so that there are no voids or interstices between the convolutions of the adjacent wires and the inner tube. Furthermore, at random intervals along and about the coil of helically laid casing wires, the material forming the inner tube extends between the adjacent wires to anchor the inner tube with respect to the coil of casing wires so that substantial longitudinal movement of the inner tube with respect to the casing wires is prevented.

A flexible plastic outer covering encompasses the coil of casing wires, the radially outer surfaces of which are embedded therein to fill all voids and interstices between the radially outer convolutions of the adjacent casing wires and the cover.

To assure the desired configuration of the cable casing, the wires are laid onto the tubing and that assembly of wires and inner tube heated sufficiently so that the heat of the casing wire melts the tubing only sufficiently to assure the desired embedment of the radially inner surface of each casing wire into the tube as the wire and inner tube assembly passes through a sizing die. Immediately thereafter this assembly is cooled to limit the melting of the inner tube to the outer surface thereof. The outer cover is preferably extruded directly onto this interfitted casing wire and inner tube assembly, and an end fitting is secured to each end of any desired length of cable casing in such a way as to effect a seal at the ends of the casing wire between the fitting and both the cover and inner tube. The cable casing is then ready to receive the core.

*Prior art*

In order more fully to explain the advantages derived from the present invention, some pertinent background information on prior art push-pull cable assemblies and the basic problems that have been solved by the prior art cable casings used in these assemblies will be discussed.

Figure 1:
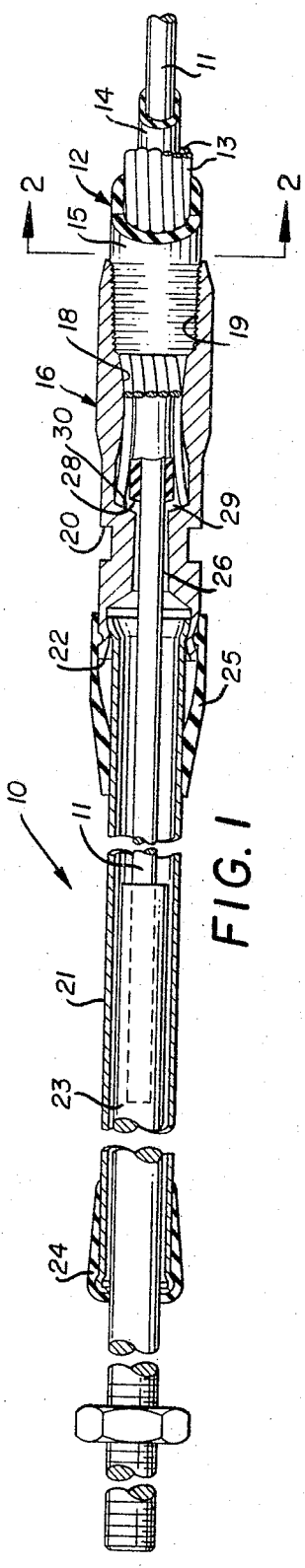
FIG. 1 is a push-pull control cable, partly in longitudinal section and partly broken away, according to the prior art.
Figure 2:
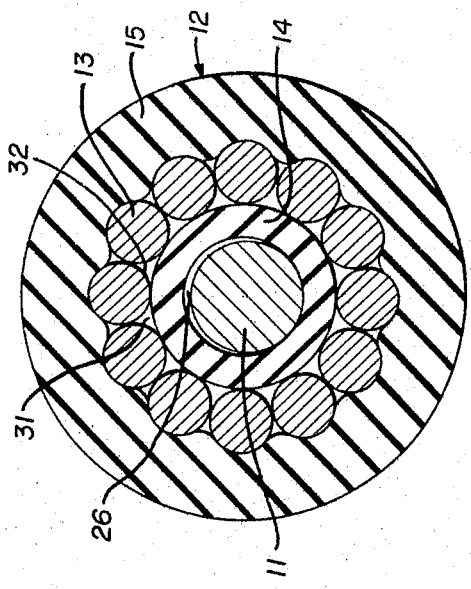
FIG. 2 is an enlarged transverse section taken substantially on line 2—2 of FIG. 1.

The prior art push-pull assembly shown in FIG. 1, and indicated generally by the numeral 10, comprises a core element 11 slidable within a conventional casing, indicated generally by the numeral 12. A plurality of casing wires 13 are contiguously laid in the form of a helical coil having a long pitch about the radially outer surface of an inner, flexible, preferably resinous plastic tube 14 which extends the full length of the casing. The wires are laid to grip the tube 14 sufficiently to prevent relative longitudinal movement between the tube and casing. An outer cover 15 encases the coil of wires 13 up to within a short distance from the end of the wires 13.

A fitting 16 is fitted over each end of the cable casing and is cold-swaged onto the exposed portions of the cylindrical grouping of wires 13, as at 18. A plurality of angular grooves at 19, within the innermost end of the fitting 16, are crimped down under the cover 15 to effect a seal between the fitting 16 and cover 15.

A recess 20, or other attaching means, is provided on fitting 16 for attaching the cable end to an anchoring point. Generally, an extension tube 21 is swivally mounted in the fitting 16, as by the socket arrangement 22. Extension tube 21 slidably receives an end rod 23 which is connected to the end of the core 11. Extension tube 21 is closely fitted around end rod 23 to guide the rod 23 and prevent excess deflection of that portion of the core element 11 sliding therein, when subjected to compressive loads.

Sealing elements 24 and 25 are provided at the end of the extension tube 21 between the tube 21 and the end rod 23 and between the tube 21 and the end fittings 16, respectively. While these sealing means 24 and 25 are effective in preventing large amounts of water and dirt from entering the central passageway 26 which extends through the cable casing 12, end fitting 16 and extension tubes 21, the reciprocating action of the end rod 23 and core element 11 has a pump-like action. Thus, particularly when the cable is used in an environment where it is exposed to water as in outboard motor installations, water does find its way into passageway 26.

The plastic inner tube 14 and the end fitting 16 tend to protect the wires 13 from the corrosive action of the water and dirt that finds its way into passageway 26, except at the ends of the wires 13.

As has been heretofore mentioned, the stranding machine which lays the wires 13 into the helical coil does so onto the inner tube 14 so as to grip the tube 14 sufficiently to anchor it against overall longitudinal movement and yet not deform the cylindrical interior thereof. Because plastic inner tube 14 is pulled through the stranding machine along with the wires 13, and because the tube 14 is somewhat elastic, it will be retained by the wires 13 in a slightly elongated, or stretched, condition. The cumulative effect of cutting the casing to length, swaging the end fitting 16 onto the wires 13 (which causes the ends to flare slightly), and the flexing of the cable instant to normal use will cause the squared end 28 of the tube 14 to draw back slightly from the original plane of the cut, allowing a space 29 to form between the end 28 of the tube 14 and the shoulder 30 of the fitting 16 against which the ends of the wires 13 abut.

Because of this retraction of the end of tube 14, the water or other deleterious matter which finds its way into passageway 26 has ready access to the now exposed ends of wires 13. Once the water comes in contact with the ends of wires 13, it will progress along the voids, or interstices, 31 between the radially inner convolutions 32 of adjacent wires 13 and the radially outer surface of tube 14 because of either the aforementioned pumping action of the end rod 23 and core element 11, capillary action, or gravity. This permits the entire length of the wires 13 to be subject to corrosive action and the attendant loss of flexibility of the casing.

In an attempt to obviate this destructive result, some cables have been manufactured in which grease has been used to fill the voids 31. So long as the grease fills these interstices 31, water cannot enter. However, control cables are used in a variety of installations subject to wide variations in temperature. When the temperature is high, as, for example, in an engine room, the grease softens and will seep into the very small clearance area in passageway 26 between the core element 11 and inner tube 14. Then, at lower temperatures, this grease in passageway 26 will cause serious drag or even a complete freeze-up of the core movement. This is especially the situation because the radial bearing clearance between the core 11 and tube 14 must be held very close, e.g., in some installations as small as .005 inch, because cable backlash is a direct function of the bearing clearance.

*The improved cable casings*

An improved cable casing made in accordance with the concept of the present invention is indicated generally by the numeral 40 in FIG. 3. The wires 41 in cable casing 40 are preferably oil-tempered, carbon steel, dead-straight spring wires and are laid in substantially side-by-side contact to form a substantially cylindrical grouping around the radial outer surface of a flexible, resinous thermo-plastic, preferably nylon, polyethylene or linear polyethylene, inner tube 42. These wires 41 are helically laid around the tube 42 in a fairly long pitched spiral but, because of normal variations in the straightness of the individual wires, together with the manufacturing tolerances of the wire and tube diameter, the plurality of helically laid wires will not all be positioned in completely touching side-by-side contact. The casing is actually constructed so that if the diameter of all the wires 41 are at the maximum tolerance limit and the diameter of the tube 42 is at a minimum tolerance limit, the wires will lay snugly over tube 42 with a cumulative separation space between the wires amounting to a few thousandths of an inch in smaller cable sizes, and as much as one-sixteenth of an inch in the larger cable sizes.

This separation, or spacing, will not occur uniformly between any two given wires 41. In fact, the cumulative spacing will be distributed in random amounts and at random positions around and along the cylindrical grouping of wires.

As shown in FIG. 5, the chain line 44 represents the outer circumference of the circle on which the radially innermost edge of the wires 41 are laid. The individual separation spacings 45a, 45b, 45c, 45d and 45e (exaggerated for clarity) in the summation are equal to the few thousandths to one-sixteenth of an inch explained above. These random spacings will vary, not only around the cylindrical grouping of wires 41 but also in their lineal disposition along the length of the cable casing.

Accordingly, when the wires 41 are positioned around an inner tube 42, which is constructed to fill the voids and interstices between the chain circle 44 and the radially inner convolutions of successive wires 41, and also extend through the separation of spacings 45a–45e, two major drawbacks of the prior art casings are obviated: There are no voids along the radially inward side of the wires 41 along which water can travel; and, the inner tube 42 is securely anchored against overall movement with respect to the casing wire at the random locations where the key projections 46 are locked between adjacent wires.

As is best shown in FIG. 3, the anchoring of the inner tube 42 to the wires 41 prevents even the squared end-cut 48 of tube 42 from receding from the plane of the cut ends of the wires 41, either at the time the casing is cut into lengths, at the time the end fitting 49 is swaged onto the casing, or after continued use of the casing.

Further assurance of a leak-proof connection between the end fitting 49 and casing 40 is obtained in the provision of a washer 50 which is positioned between the end of the casing and shoulder 51 in fitting 49. The washer is preferably of a flexible material and is waterproof and water-resistant. By seating the ends of the wires 41 firmly against and into the washer 50, the washer will in turn press tightly against and slightly deform the square cut end 48 of the anchored inner tube 42, increasing the sealing effect between the tube 42 and the end fitting 49.

The annular grooves 52 within the inner end of the end fitting 50 are pressed firmly into the outer covering 53 of the casing to assure an effective seal against the outer elements. It has been found that the most suitable outer covering material is linear polyethylene which in no way hinders the flexibility of the cable and yet provides a tough exterior.

By providing an outer cover 53 (FIG. 6) in which the radially outer convolutions of the wires 41 are embedded, there are no voids or interstices on the radially outer side of the wires along which water can seep. This becomes especially important in the situation where a portion of the outer cover 53 has been abraded or otherwise damaged so as to expose a portion of the wires 41. In the improved cable, corrosion would be confined to the exposed area. It should be similarly apparent that should the washer 50 be damaged, only the very ends of the wire would be exposed to corrosion since both the radially inner and the radially outer sides of the wires are completely embedded.

*Method for manufacturing the improved cable casing*

The wires 41 are laid in a long pitched helix about a flexible inner tube 42 which is fed axially into a stranding machine 58 (FIG. 7). Stranding machines capable of laying the spring wire into a long pitched helix without twisting or "forming" the wire are well known to the art and, since the particulars of such a stranding machine form no part of the present invention, it has been represented only schematically in FIG. 7 of the drawings. As the helically wound spiral of wires 41 leave the stranding machine 58 they are passed through a closing die 59. At this stage in the operation, the wires 41 and tube 42 appear as shown in FIG. 8 cross section. The outer diameter of the tube 42 is slightly greater than the inner diameter of the radially innermost surfaces of the wires 41 so that the closing die 59 causes the wires to slightly deform the outer surface of tube 42. The closed assembly of wires 41 and tube 42 is then moved through the coil 60 of an induction heater. The use of a high frequency current in coil 60 almost instantly brings the outer surface of each wire 41 to a temperature of approximately 350–400° F. without affecting the non-conducting components or inner tube 42 of the casing. By bringing the temperature of the wire surface above the melting temperature of the tube 42 and yet below the annealing temperature of the wire, the radially outer surface of tube 42 melts along the area of contact the tube 42 has with the radially inner surface of the heated casing wires. Immediately after passing through the induction heating coil 60, the tube and wire assembly is fed through a sizing die 61 and a cooling station 62.

The sizing die forces or maintains the outer diameter of the casing to within manufacturing tolerances.

The slight closing action that die 61 imparts to the casing wires 40, the internal stresses of the tube 42 due to the slight deformation caused by the lay of the casing wire, and the slight radially inwardly directed spring tension of the wires themselves forces the melted portion of the radially outer surface of tube 42 to flow radially outwardly into the voids between the successive wires 41 and the inner tube 42, as well as slightly through and along the separating spacings 45a–45e, so that the tube 42 is effectively keyed to the casing wires by anchors 46a–46e.

The cooling station 62 includes a sleeve 63 with a bore 64 therethrough somewhat larger than the outer diameter of the wire and tube assembly. The bore 64 communicates with a feed pipe 65 for supplying a coolant flow through bore 64. It has been found that oil provides an excellent coolant and at the same time lubricates the outer surfaces of the wires 41 with a very thin film. This film can be permanently retained on the wire as a further rust inhibiter.

By proper spacial relation between the coil 60 and cooling station 62 in conjunction with the lineal speed of the casing and tube assembly therethrough, the surface of the wires can be heated, the outer surface of the tube melted in the proper position, and the assembly quenched in a sequential operation requiring less than a second. The high speed with which the operation is effected assures that only the surface of tube 42 is heated by conduction from the wires and that no appreciable amount of heat is applied to the overall volume of the tube 42 which could result in permanent deformation thereof.

After the wire 41 and tube 42 assembly has been thus cooled, the plastic cover 53 is extruded in place on the radial outer surface of the helically wound cylindrical grouping of wires 41. The plastic cover 53 maintains the wires against radially outward movement. However, in some constructions additional or other radial restraining means may be desired. The extrusion die 66 not only smooths the cover to a cylindrical shape, but also forces the plastic cover material into the voids between successive convolutions of adjacent wires 41, as shown in FIG. 6. As soon as the cover is in place the assembly is cooled, as by running water at station 68, to withdraw any residual heat to prevent heat deformation of the inner tube 42.

The casing may then be spooled for bulk sales or cut into lengths and fitted with end fittings.

When the end fittings 49 are swaged into gripping engagement with the wires 41, the wires are forced tightly together as a cylindrical group with the points of contact between the wires being slightly flat. This produces a necking-down of the wires at that point, which provides a very strong joiner of the end fitting to the cable but, at the same time, reduces the inner diameter of tube 42. Before supplying the casing with a core, the reduced internal diameter is reamed to proper size.

In a cable constructed according to the present invention the tube 42 is sufficiently anchored to the casing wire that, even under continued use, the reamed portion does not move longitudinally with respect to the coil of wires. However, in prior art constructions wherein this anchoring was not so effectively accomplished, the end of the tube could retreat in use so that an unreamed thickness of the tube would be positioned at the necked-down portion of the wires. This closed the interior of the tube at that point, gripping the cable core like a lathe collet, with a resultant serious loss of efficiency and, in some cases, a complete lock-up of the core element.

It should be apparent, from the foregoing detailed description of the improved push-pull cable casing and the method of manufacturing the same, that such a casing accomplishes the objects of the invention.

What is claimed is:

1. The method of manufacturing a push-pull control cable casing comprising the steps of, stranding a plurality of wires onto the radially outer surface of an inner flexible thermoplastic tube, heating said wires to melt and conform the radially outer surface of said tube with the inner surfaces of said wires, cooling said wire and inner tube, and applying a radial restraining means to said coiled wire and tube.

2. The method of manufacturing a push-pull control cable casing comprising the steps of, stranding a plurality of wires into the form of a long pitched helical coil about the radially outer surface of a flexible cylindrical thermoplastic inner tube, said wires being stranded to a cylindrical grouping having an inner diameter less than the outer diameter of said inner tube, heating said wires to melt and conform the radially outer surface of said tube with the inner surfaces of said wires, cooling said wire and inner tube, and applying a flexible outer cover on said coiled wires and tube.

3. The method of manufacturing a push-pull control cable casing comprising the steps of, stranding a plurality of wires into the form of a long pitched helical coil about the radially outer surface of a flexible thermoplastic cylindrical inner tube, said wires being stranded to a cylindrical grouping having an inner diameter less than the outer diameter of said inner tube, heating said wires to melt and conform the radially outer surface of said tube with the inner surfaces of said wires, sizing said heated assembly of wires and inner tube, the relative diameters of said wires and said inner tube after sizing being such that separation spacings are provided at random intervals around and along said coil of wires, cooling said wires and inner tube, and applying radial restraining means to said coiled wires and tube.

4. The method of manufacturing a push-pull control cable casing comprising the steps of, stranding a plurality of dead-straight spring wires into a long pitched helical coil about and onto a flexible thermoplastic inner tube, closing said coil tightly onto said inner tube so that the radially outer surface of said inner tube is slightly deformed by the wires of said coil and so that separation spacings are provided between the adjacent wires of said coil at random locations around and along said coil, heating said coil of wires to a temperature above the melting point of the material of said inner tube but below the annealing temperature of said wires, sizing said coil of heated wires into said inner tube, sequentially cooling said coil of wires below the melting temperature of said inner tube so that only the radially outer surface of said inner tube is melted, and applying a flexible outer cover onto the radially outer surface of said coiled wire.

5. The method of manufacturing a push-pull control cable casing comprising the steps of, stranding a plurality of dead-straight oil tempered spring wires into a long pitched helical coil about and onto a flexible polyethylene inner tube, closing said coil tightly onto said polyethylene tube so that the radially outer surface of said tube is deformed by the wires of said coil and so that separation spacings are provided between the adjacent wires of said coil at random locations around and along said coil, heating said coil of wires to a temperature of 350–400°, sizing said coil of wires into said polyethylene tube, cooling said coil of heated wires to a temperature below the melting point of said polyethylene tube after only the radially outer surface is melted, extruding a flexible outer cover onto the radially outer surface of said coiled wires.

6. The method of manufacturing a push-pull control cable casing comprising the steps of, stranding a plurality of dead-straight spring wires into a long pitched helical coil about and onto a flexible polyethylene inner tube, closing said coil tightly onto said polyethylene tube so that the radially outer surface of said tube is deformed by the wires of said coil and so that separation spacings are provided between the adjacent wires of said coil at random locations around and along said coil, heating said coil of wires to a temperature of 350–400°, sizing said coil of wires into said polyethylene tube, cooling said coil of heated wires to a temperature below the melting point of said polyethylene tube after only the radially outer surface is melted, extruding a flexible outer covering of linear polyethylene onto the radially outer surface of said coiled wires so as to fill the voids between the convolutions of adjacent wires.

7. The method of manufacturing a push-pull control cable casing comprising the steps of, stranding a plurality of dead-straight spring wires into a long pitched helical coil about and onto a flexible inner thermoplastic tube, closing said coil tightly onto said inner tube so that the radially outer surface of said inner tube is deformed by the wires of said coil and so that separation spacings are provided between the adjacent wires of said coil at random locations around and along said coil, heating said coil of wires to a temperature above the melting point of the thermoplastic material of said inner tube but below the annealing temperature of said wires, sizing said coil of heated wires into said inner tube, sequentially cooling said coil of wires below the melting temperature of said inner tube so that only the radially outer surface of said inner tube is melted, and applying a radial restraining means onto the radially outer surface of said coiled wire.

8. The method of manufacturing a push-pull control cable casing comprising the steps of, stranding a plurality of dead-straight spring wires into a long pitched helical coil about and onto a flexible thermoplastic inner tube, closing said coil tightly onto said inner tube so that the radially outer surface of said inner tube is deformed by the wires of said coil and so that separation spacings are provided between the adjacent wires of said coil at random locations around and along said coil, heating said coil of wires to a temprature above the melting point of the material of said inner tube but below the annealing temperature of said wires, sizing said coil of heated wires into said inner tube, sequentially cooling said coil of wires below the melting temperature of said inner tube so that only the radially outer surface of said inner tube is melted, applying a flexible outer cover onto the radially outer surface of said coiled wire, positioning an end fitting over each end of the coiled wires with a resilient washer between the ends of said wires and a shoulder in said end fitting, seating said wires into said washer so said washer presses against said inner tube, swaging said end fitting into fixed engagement with said wires.

References Cited by the Examiner

UNITED STATES PATENTS

| | | | |
|---|---|---|---|
| 1,661,835 | 3/1928 | Keller | 29—452 |
| 2,564,602 | 8/1951 | Hurst | 138—125 |
| 2,706,494 | 4/1955 | Morse. | |
| 2,740,226 | 4/1956 | Arff. | |
| 3,006,794 | 10/1961 | Sheldon | 29—452 |
| 3,020,701 | 2/1962 | McCormick. | |
| 3,062,241 | 11/1962 | Brumbach | 138—125 |
| 3,130,754 | 4/1964 | Bratz | 138—133 |
| 3,214,995 | 11/1965 | Gilmore. | |

CHARLIE T. MOON, *Primary Examiner.*

BROUGHTON G. DURHAM, P. W. SULLIVAN,
*Examiners.*